United States Patent
Lu et al.

(10) Patent No.: US 8,842,062 B2
(45) Date of Patent: Sep. 23, 2014

(54) PIXEL DRIVING CIRCUIT, DRIVING METHOD THEREOF, AND PIXEL MATRIX

(71) Applicant: AU Optronics Corp., Hsin-Chu (TW)

(72) Inventors: Mei-Ju Lu, Hsin-Chu (TW); Sau-Wen Tsao, Hsin-Chu (TW); Yen-Ying Kung, Hsin-Chu (TW); Cho-Yan Chen, Hsin-Chu (TW); Tien-Lun Ting, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 13/846,376

(22) Filed: Mar. 18, 2013

(65) Prior Publication Data

US 2014/0160103 A1    Jun. 12, 2014

(30) Foreign Application Priority Data

Dec. 7, 2012    (TW) .............................. 101146226 A

(51) Int. Cl.
*G09G 3/36*    (2006.01)

(52) U.S. Cl.
CPC .................................... *G09G 3/3696* (2013.01)
USPC ................. 345/92; 345/87; 345/98; 345/212; 345/48; 345/144

(58) Field of Classification Search
USPC .............. 345/87–94, 204–205, 55, 694, 690, 345/211–212; 349/37–43, 46–48, 139–144
See application file for complete search history.

(56) References Cited

U.S. PATENT DOCUMENTS

| | | | |
|---|---|---|---|
| 2006/0215066 A1* | 9/2006 | Ueda et al. | 349/38 |
| 2008/0303768 A1* | 12/2008 | Do et al. | 345/90 |
| 2009/0009458 A1* | 1/2009 | Bae et al. | 345/92 |
| 2010/0123841 A1* | 5/2010 | Shin | 349/38 |

* cited by examiner

*Primary Examiner* — Lun-Yi Lao
*Assistant Examiner* — Md Saiful A Siddiqui
(74) *Attorney, Agent, or Firm* — Morris Manning & Martin LLP; Tim Tingkang Xia, Esq.

(57) ABSTRACT

A pixel driving circuit is electrically coupled between a first data line and a second data line and between a first scan line and a second scan line, and includes a first switch, a second switch, a third switch, a fourth switch, a liquid crystal capacitor electrically connected between the first switch and the second switch, a first capacitor electrically connected to the first switch, a second capacitor electrically connected to the second switch, a first storage capacitor, a second storage capacitor and at least one switching unit. The first storage capacitor is electrically connected to the third switch and supplied by a reference voltage. The second storage capacitor is electrically connected to the fourth switch and supplied by the reference voltage. The at least one switching unit is used for redistributing charges in the pixel driving circuit.

8 Claims, 7 Drawing Sheets

PIXEL DRIVING CIRCUIT, DRIVING METHOD THEREOF, AND PIXEL MATRIX

CROSS-REFERENCE TO RELATED APPLICATIONS

This non-provisional application claims priority under 35 U.S.C. §119(a) on Patent Application No(s). 101146226 filed in Taiwan, R.O.C. on Dec. 7, 2012, the entire contents of which are hereby incorporated by reference.

TECHNICAL FIELD

The disclosure relates to a pixel driving circuit, and more particularly to a pixel driving circuit with high transmittance, a driving method thereof and a pixel matrix.

BACKGROUND

With the development of liquid crystal display devices with large size, to overcome the viewing angle problem of large-size displays, ongoing advancements and breakthroughs are required for wide viewing angle technologies of liquid crystal display panels accordingly. Until now, technologies that are capable of satisfying the wide viewing angle requirement include, for example, the multi-domain vertical alignment (MVA), the multi-domain horizontal alignment (MHA), the twisted nematic film (TN+film) and the In-Plane Switching (IPS).

Through the technologies listed above, a liquid crystal display may have a wide viewing angle. However, a color washout problem occurs. To solve the problem of color washout of a liquid crystal display with a large viewing angle, currently it is proposed that each pixel in a liquid crystal display panel is divided into two subpixels capable of being independently driven. One of the two subpixels displays a color of a high grayscale, and the other displays a color of a low grayscale. Therefore, after the color of a high grayscale and the color of a low grayscale are mixed to form a color of an intermediate grayscale, a video image having a similar hue can be viewed no matter if the user views the video picture, displayed by the liquid crystal display, in right front of the liquid crystal display or from an angle. Until now, liquid crystal displays employ electrodes on the same plane and a vertical alignment liquid crystal use a driving method of electrodes at the same plane. The tilt degrees of liquid crystals depends on the electrical field intensity (E), the electrical field intensity (E) depends on an electrode pitch (d) and a driving voltage (V). The relation may be expressed as E=V/d. Therefore, it can be known that the electrical field intensity is affected by an electrode pitch and a driving voltage.

To correct the color washout, multiple groups of electrode pitches are usually designed, so that pixels can support the wide viewing angle. In the design of ITO electrode pitches, it is expected that the ratio between the pixel area of a wide electrode pitch and the pixel area of a narrow electrode pitch is about 7:3.

However, for a wide electrode pitch, a high data driving voltage is required to generate a sufficient electrical field, so that liquid crystals have a large tilt angle for achieving a sufficient transmittance. For example, an electrode pitch larger than 16 um requires a voltage of at least 16 V to approximate a saturated degree for driving pixels. The output voltage of an integrated circuit until now is 16 V at most, so that the voltage difference, used for controlling the liquid crystal, between two electrodes is insufficient to drive a pixel having an electrode pitch larger than 16 um. This causes the pixel having a wide electrode pitch has an undesirable transmittance performance, and then such a wider electrode pitch fails to be utilized to correct the color washout at the side view.

SUMMARY

A pixel driving circuit disclosed in an embodiment of the disclosure is electrically coupled between a first data line and a second data line, and is electrically coupled between a first scan line and a second scan line. The pixel driving circuit includes a first switch, a second switch, a third switch, a fourth switch, a liquid crystal capacitor, a first capacitor, a second capacitor, a first storage capacitor, a second storage capacitor and at least one switching unit.

The first switch has a first end, a second end and a control end, the first end of the first switch is electrically connected to the first data line, and the control end of the first switch is electrically connected to the first scan line. The second switch has a first end, a second end and a control end, the first end of the second switch is electrically connected to the second data line, and the control end of the second switch is electrically connected to the first scan line. The third switch has a first end, a second end and a control end, the first end of the third switch is electrically connected to the first data line, and the control end of the third switch is electrically connected to the first scan line. The fourth switch has a first end, a second end and a control end, the first end of the fourth switch is electrically connected to the second data line, and the control end of the fourth switch is electrically connected to the first scan line.

The liquid crystal capacitor is formed between the second end of the first switch and the second end of the second switch. The first capacitor has a first end and a second end, and the first end of the first capacitor is electrically connected to the second end of the first switch. The second capacitor has a first end and a second end, and the first end of the second capacitor is electrically connected to the second end of the second switch. The first storage capacitor has a first end and a second end, the first end of the first storage capacitor is electrically connected to the second end of the third switch, and the second end of the first storage capacitor is used for receiving a reference voltage. The second storage capacitor has a first end and a second end, the first end of the second storage capacitor is electrically connected to the second end of the fourth switch, and the second end of the second storage capacitor is used for receiving the reference voltage.

The at least one switching unit has a first end, a second end and a control end, the first end of the at least one switching unit is electrically connected to the first end of the first storage capacitor and the second end of the second capacitor, the control end of the at least one switching unit is electrically connected to the second scan line, and the second end of the at least one switching unit is electrically connected to the first end of the second storage capacitor and the second end of the first capacitor.

A driving method disclosed in an embodiment of the disclosure is adapted to the foregoing pixel driving circuit, and comprises following steps. The first scan line is enabled, and a first data voltage and a second data voltage, which has a polarity different from a polarity of the first data voltage, are supplied to the pixel driving circuit. The second scan line is enabled, and the at least one switching unit is turned on to distribute charges in the pixel driving circuit.

A pixel matrix disclosed in an embodiment of the disclosure includes a plurality of first scan lines, a plurality of second scan lines, a plurality of first data lines, a plurality of second data lines, and a plurality of subpixels. Each subpixel is electrically connected to the corresponding first scan line and the corresponding second scan line, and is electrically connected to the corresponding first data line and the corresponding second data line. Each pixel includes a first switch, a second switch, a third switch, a fourth switch, a liquid crystal capacitor, a first capacitor, a second capacitor, a first storage capacitor, a second storage capacitor and at least one switching unit. The connection relations among the first switch, the second switch, the third switch, the fourth switch, the liquid crystal capacitor, the first capacitor, the second capacitor, the first storage capacitor, the second storage capacitor and the at least one switching unit can refer to the above description of the pixel driving circuit.

BRIEF DESCRIPTION OF THE DRAWINGS

The disclosure will become more fully understood from the detailed description given herein below for illustration only and thus does not limit the disclosure, wherein.

DETAILED DESCRIPTION

Figure 1:
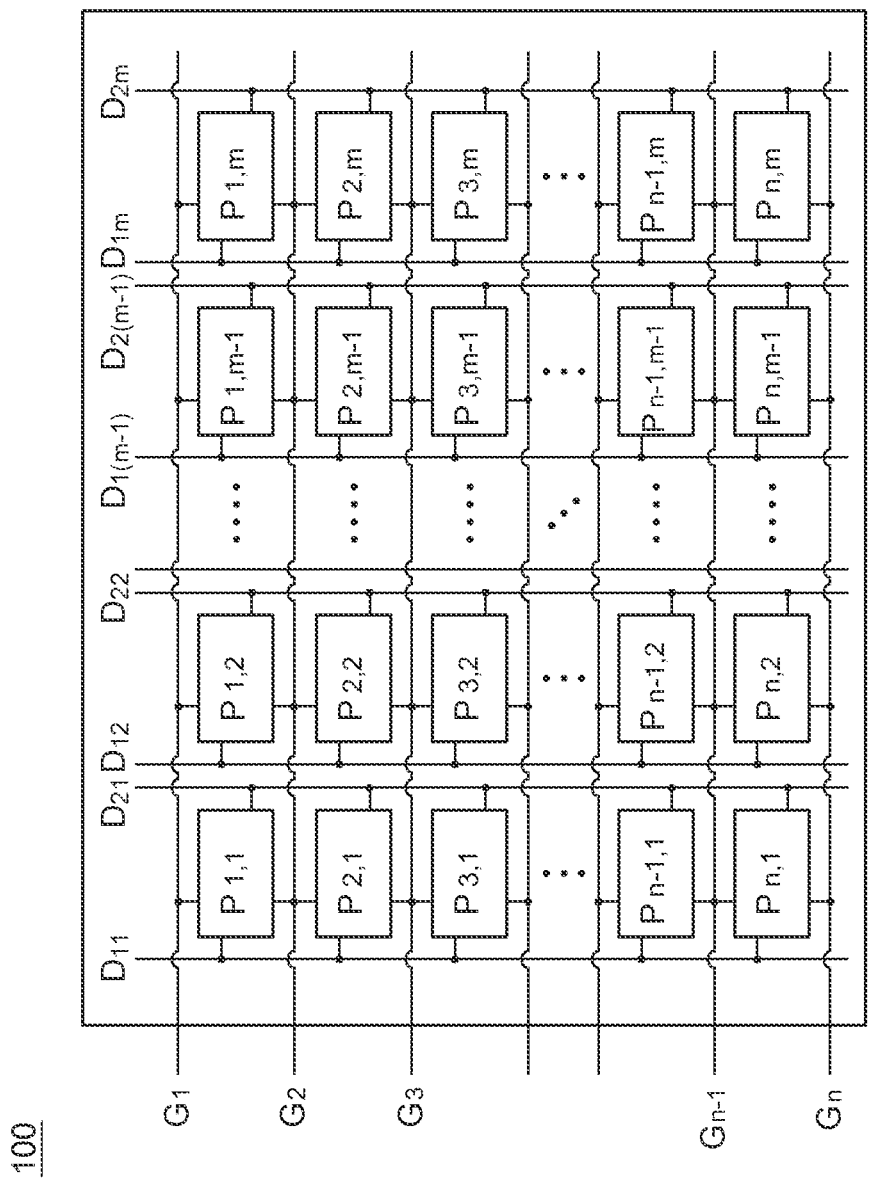
FIG. 1 is a schematic view of a pixel matrix in the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic view of a circuit structure of a pixel matrix 100. The pixel matrix 100 includes a plurality of scan lines $G_1$ to $G_n$, a plurality of first data lines $D_{11}$ to $D_{1\,m}$, a plurality of second data lines $D_{21}$ to $D_{2\,m}$, and a plurality of subpixels $P_{1,1}$ to $P_{n,m}$. The first data lines $D_{11}$ to $D_{1m}$ and the second data lines $D_{21}$ to $D_{2\,m}$ are arranged parallel to each other. The first data lines $D_{11}$ to $D_{1m}$ and the second data lines $D_{21}$ to $D_{2\,m}$ cross the scan lines $G_1$ to $G_n$ to form a pixel matrix. For example, the first subpixel $P_{1,1}$ is electrically connected to the corresponding scan line $G_1$, and the first subpixel $P_{1,1}$ is electrically connected to the corresponding first data line $D_{11}$ and the corresponding second data line $D_{21}$. The first subpixel $P_{1,1}$ in the pixel matrix 100 is a pixel driving circuit 200, which is described below.

Figure 2:
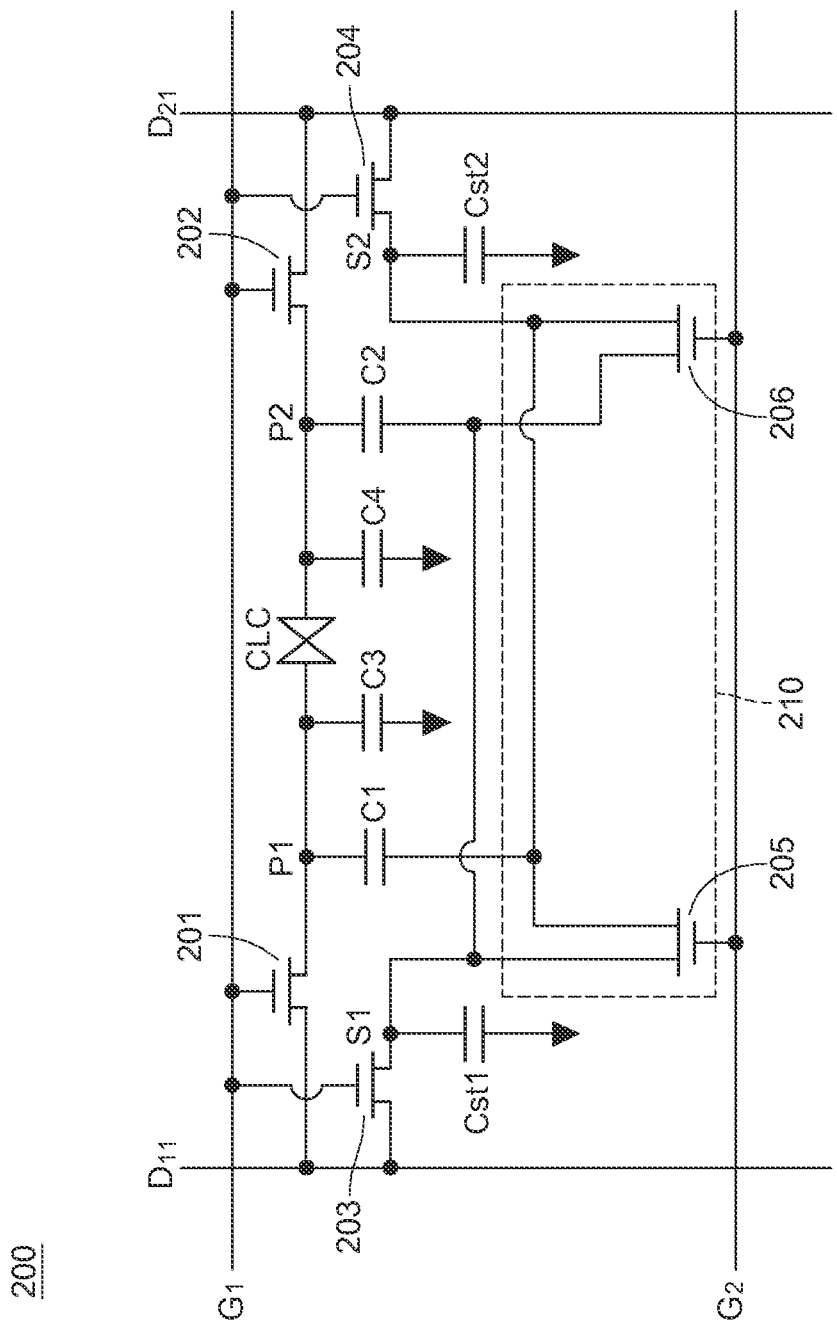
FIG. 2 is a schematic circuit diagram of a pixel driving circuit in the disclosure.

FIG. 2 is a schematic circuit diagram of a pixel driving circuit 200, and mainly the first subpixel $P_{1,1}$ in FIG. 1 is taken for illustration. The pixel driving circuit 200 is electrically coupled between the first data line $D_{11}$ and the second data line $D_{21}$, and is electrically coupled between the scan line $G_1$ and the scan line $G_2$. The pixel driving circuit 200 includes a first switch 201, a second switch 202, a third switch 203, a fourth switch 204, a liquid crystal capacitor CLC, a first capacitor C1, a second capacitor C2, a first storage capacitor Cst1, a second storage capacitor Cst2 and at least one switching unit 210.

The first switch 201 is a transistor and has a first end, a second end and a control end, the first end of the first switch 201 is electrically connected to the first data line $D_{11}$, the second end of the first switch 201 is electrically connected to a node P1, and the control end of the first switch 201 is electrically connected to the scan line $G_1$.

The second switch 202 is a transistor and has a first end, a second end and a control end, the first end of the second switch 202 is electrically connected to the second data line $D_{21}$, the second end of the second switch 202 is electrically connected to a node P2, the control end of the second switch 202 is electrically connected to the scan line $G_1$, and the liquid crystal capacitor CLC is formed between the second end of the first switch 201 and the second end of the second switch 202.

The third switch 203 is a transistor and has a first end, a second end and a control end, the first end of the third switch 203 is electrically connected to the first data line $D_{11}$, the second end of the third switch 203 is electrically connected to a node S1, and the control end of the third switch 203 is electrically connected to the scan line $G_1$.

The fourth switch 204 is a transistor and has a first end, a second end and a control end, the first end of the fourth switch 204 is electrically connected to the second data line $D_{21}$, the second end of the fourth switch 204 is electrically connected to a node S2, and the control end of the fourth switch 204 is electrically connected to the scan line $G_1$.

The first capacitor C1 has a first end and a second end, the first end of the first capacitor C1 is electrically connected to the second end of the first switch 201. The second capacitor C2 has a first end and a second end, and the first end of the second capacitor C2 is electrically connected to the second end of the second switch 202. The first storage capacitor Cst1 has a first end and a second end, the first end of the first storage capacitor Cst1 is electrically connected to the second end of the third switch 203, and the second end of the first storage capacitor Cst1 receives a reference voltage. The second storage capacitor Cst2 has a first end electrically connected to the second end of the fourth switch 204, and a second end receives the reference voltage.

At least one switching unit 210 is electrically connected to the scan line $G_2$, the first end of the first storage capacitor Cst1, the first end of the second storage capacitor Cst2, the second end of the first capacitor C1, and the second end of the second capacitor C2, and is used for redistributing charges between the first storage capacitor Cst1 and the second capacitor C2, and for redistributing charges between the second storage capacitor Cst2 and the first capacitor C1.

In this embodiment, the at least one switching unit 210 includes practically a plurality of switching units, for example, a fifth switch 205 and a sixth switch 206. The fifth switch 205 is a transistor and has a first end electrically connected to the first end of the second storage capacitor Cst2 and the second end of the first capacitor C1, a control end electrically connected to the scan line $G_2$, and a second end electrically connected to the first end of the first storage capacitor Cst1 and the second end of the second capacitor C2. The sixth switch 206 is a transistor and has a first end electrically connected to the first end of the first storage capacitor Cst1 and the second end of the second capacitor C2, a control end electrically connected to the scan line $G_2$, and a second end electrically connected to the first end of the second storage capacitor Cst2 and the second end of the first capacitor C1.

In another embodiment, the pixel driving circuit 200 further includes a third capacitor C3 and a fourth capacitor C4, which have a first end and a second end. The first end of the third capacitor C3 is electrically connected to the first end of the first capacitor C1, the second end of the third capacitor C3 is used for receiving the reference voltage. The first end of the fourth capacitor C4 is electrically connected to the first end of the second capacitor C2, and the second end of the fourth capacitor C4 is used for receiving the reference voltage.

Figure 3:
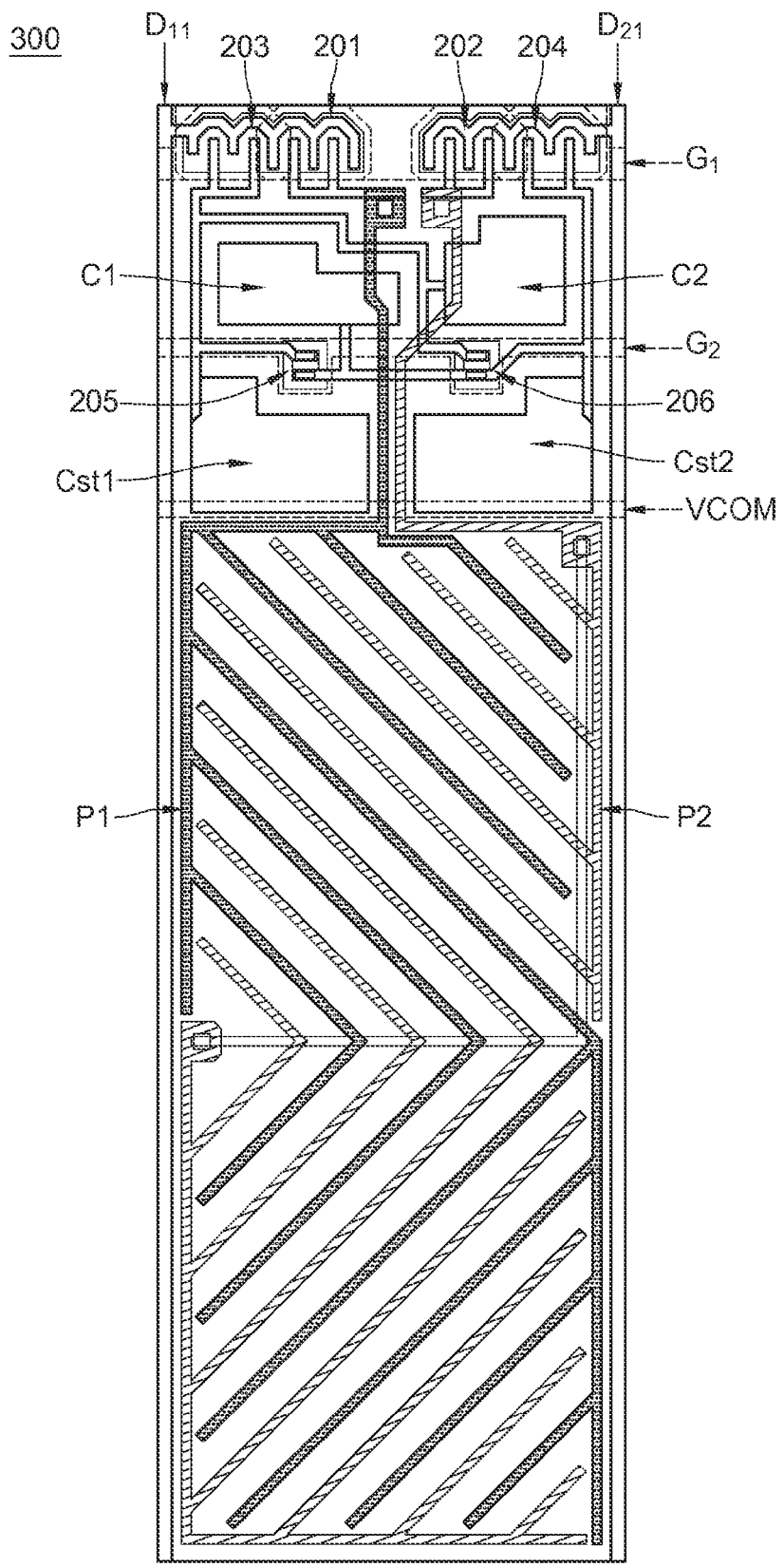
FIG. 3 is a schematic view of a pixel array circuit layout of a pixel driving circuit in the disclosure.

FIG. 3 is a schematic view of a pixel array circuit layout 300 according to an embodiment of the disclosure. To correspond to the above embodiment, the same label is adopted for the same elements, and one of the subpixels is used for illustration. The pixel array circuit layout 300 includes a first switch 201, a second switch 202, a third switch 203, a fourth switch 204, a fifth switch 205, a sixth switch 206, a first capacitor C1, a second capacitor C2, a first storage capacitor Cst1, a second storage capacitor Cst2, a scan line $G_1$, a scan line $G_2$, a first data line $D_{11}$ and a second data line $D_{21}$.

The scan line $G_1$ and the scan line $G_2$ intersect the first data line $D_{11}$ and the second data line $D_{21}$, and each switch is connected to the scan line and the data line. The first switch 201 is electrically connected to the scan line $G_1$ and the first data line $D_{11}$. The second switch 202 is electrically connected to the scan line $G_1$ and the second data line $D_{21}$. The third switch 203 is electrically connected to the scan line $G_1$ and the first data line $D_{11}$. The fourth switch 204 is electrically connected to the scan line $G_1$ and the second data line $D_{21}$. The third switch 203 is electrically connected to the scan line $G_1$ and the fifth switch 205. The first storage capacitor Cst1 is adjacent to the second storage capacitor Cst2. In addition, the fourth switch 204 is electrically connected to the scan line $G_1$ and the sixth switch 206. The second storage capacitor Cst2 is located below the second capacitor C2. The node P1 is a finger electrode, and is electrically connected to the first switch 201 and the first capacitor C1. The node P2 is a finger electrode, and is electrically connected to the second switch 202 and the second capacitor C2. The driving method and operation of the disclosure are described as follows.

Figure 4:
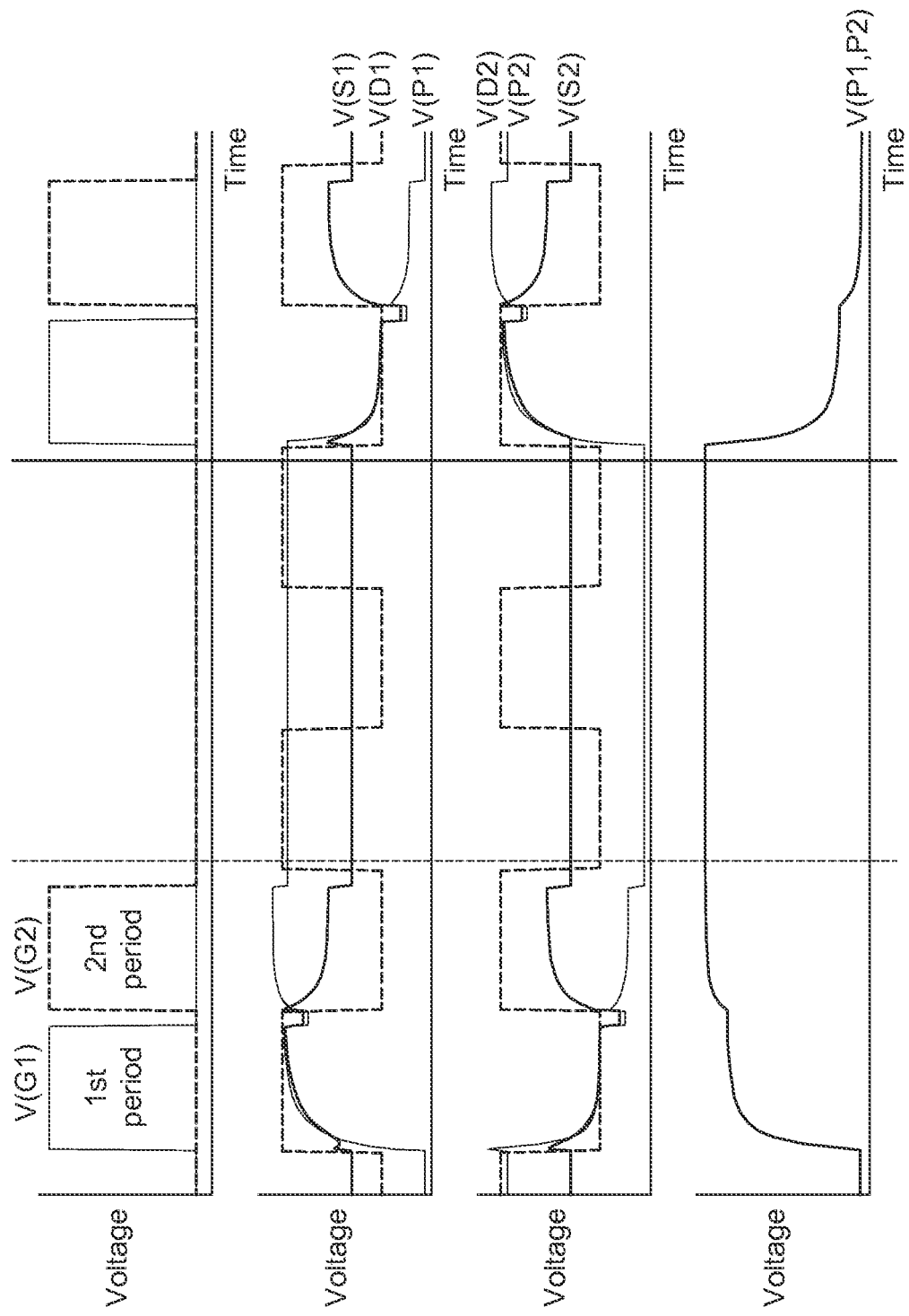
FIG. 4 is a simulation waveform diagram of a pixel driving circuit in the disclosure.

Referring to FIG. 4, the driving method for the pixel driving circuit 200 includes following steps. In a first period, when the first switch 201, the second switch 202, the third switch 203 and the fourth switch 204 are turned on, and when the scan line $G_1$ is enabled, a first data voltage is supplied to the first capacitor C1 and the first storage capacitor Cst1 through the first data line $D_{11}$, and a second data voltage, having a polarity different from that of the first data voltage, is supplied to the second capacitor C2 and the second storage capacitor Cst2 through the second data line $D_{21}$. Herein, the node P1 and the node S1 are charged via the first data line $D_{11}$ to have positive voltages, and the node P2 and the node S2 are charged via the second data line $D_{21}$ to have negative voltages.

Subsequently, in a second period, when at least one switching unit 210 is turned on and the scan line $G_2$ is enabled, the first data voltage, maintained by the first storage capacitor Cst1, and the second data voltage, maintained by the second capacitor C2 and the second storage capacitor Cst2, are redistributed, and the second data voltage, maintained by the second storage capacitor Cst2, and the first data voltage, maintained by the first capacitor C1 and the first storage capacitor Cst1, are redistributed.

Specifically, when the scan line $G_1$ is disabled and the scan line $G_2$ is enabled, the node S1 and the node S2 are conducted. Herein, the voltage of the node S1 is dropped, so that the floating voltage of the node P2 is also dropped. Meanwhile, the voltage of the node S2 is increased, so that the floating voltage of the node P1 is also increased. Therefore, the voltage difference V(P1,P2) between the two electrodes of the liquid crystal capacitor CLC is substantially increased and becomes higher than a driving voltage range.

In the first period, when the scan line $G_1$ is enabled, the first switch 201, the second switch 202, the third switch 203 and the fourth switch 204 are turned on. Herein, a first data voltage V(D1) is supplied, and a second data voltage V(D2), having the polarity different from the polarity of the first data voltage V(D1), is supplied. Thus, the voltage V(P1) of the node P1 and the voltage V(S1) of the node S1 are increased with the first data voltage V(D1), and the voltage V(P2) of node P2 and the voltage V(S2) of node S2 are dropped with the second data voltage V(D2). Herein, the node P1 and the node S1 are charged via the first data line $D_{11}$ to have positive voltages, and the node P2 and the node S2 are charged via the second data line $D_{21}$ to have negative voltages.

Subsequently, in the second period, when the scan line $G_1$ is disabled and the scan line $G_2$ is enabled, the first switch 201, the second switch 202, the third switch 203 and the fourth switch 204 are turned off, and the fifth switch 205 and the sixth switch 206 are turned on. Herein, charges are redistributed.

Specifically, the node S1 and the node S2 are conducted as the fifth switch 205 is turned on. Herein, the voltage V(S1) of the node S1 is dropped, and then the voltage V(P2) of P2 is also dropped. Meanwhile, the voltage V(S2) of the node S2 is increased, and then the voltage V(P1) of the node P1 is also increased. Thus, the voltage difference V(P1,P2) between the two electrodes of the liquid crystal capacitor CLC is increased.

Figure 5:
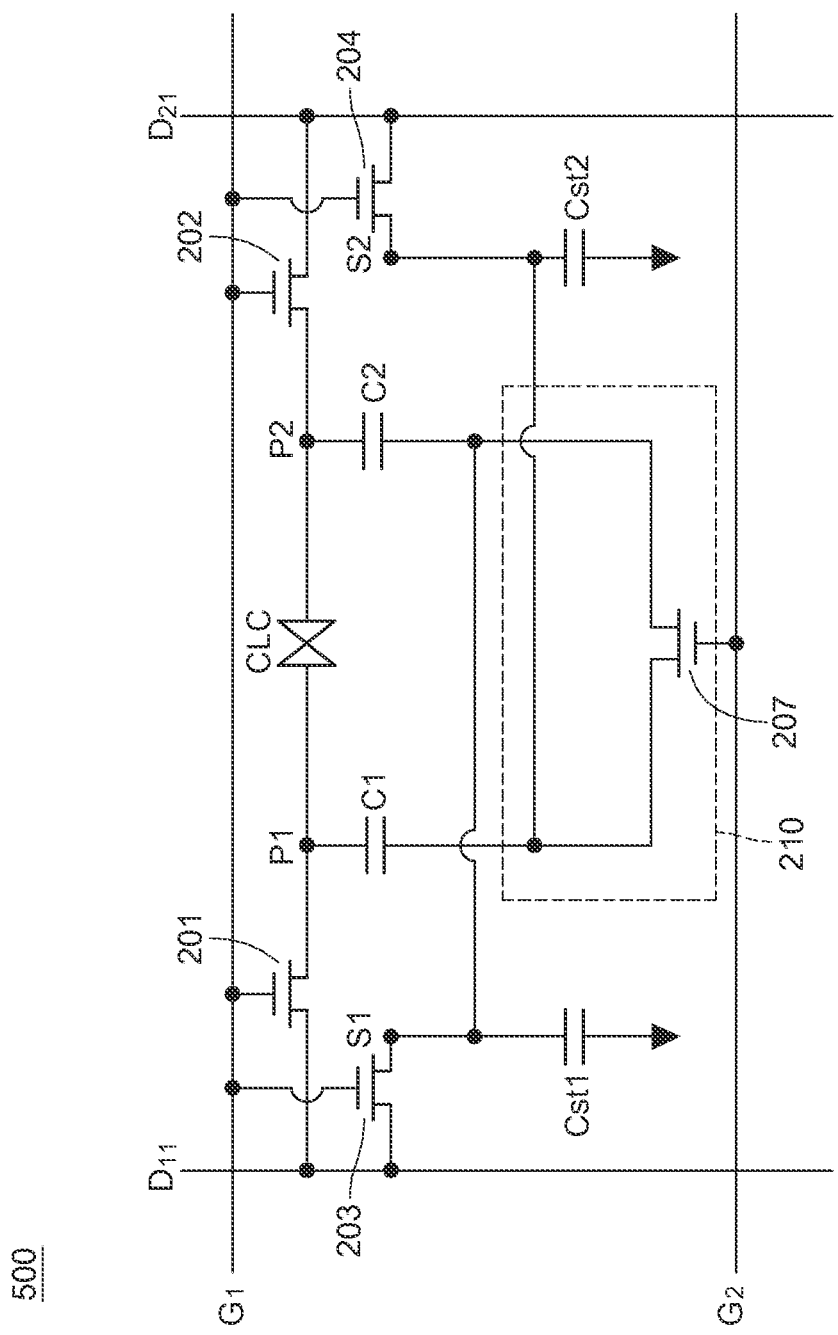
FIG. 5 is a schematic circuit diagram of a pixel driving circuit in the disclosure.

FIG. 5 is a circuit diagram of a pixel driving circuit 500 according to another embodiment of the disclosure. The pixel driving circuit 500 is electrically coupled between the first data line $D_{11}$ and the second data line $D_{21}$, and is electrically coupled between the scan line $G_1$ and the scan line $G_2$. The pixel driving circuit 500 includes a first switch 201, a second switch 202, a third switch 203, a fourth switch 204, a liquid crystal capacitor CLC, a first capacitor C1, a second capacitor C2, a first storage capacitor Cst1, a second storage capacitor Cst2 and at least one switching unit 210.

The first switch 201 is a transistor and has a first end, a second end and a control end. The first end of the first switch 201 is electrically connected to the first data line $D_{11}$, the second end of the first switch 201 is electrically connected to the node P1, and the control end of the first switch 201 is electrically connected to the scan line $G_1$. The second switch 202 is a transistor and has a first end, a second end and a control end. The first end of the second switch 202 is electrically connected to the second data line $D_{21}$, the second end of the second switch 202 is electrically connected to the node P2, and the control end of the second switch 202 is electrically connected to the scan line $G_1$. The third switch 203 is a transistor and has a first end, a second end and a control end. The first end of the third switch 203 is electrically connected to the first data line $D_{11}$, the second end of the third switch 203 is electrically connected to the node S1, and the control end of the third switch 203 is electrically connected to the scan line $G_1$. The fourth switch 204 is a transistor and has a first end, a second end and a control end. The first end of the fourth switch 204 is electrically connected to the second data line $D_{21}$, the second end of the fourth switch 204 is electrically connected to the node S2, and the control end of the fourth switch 204 is electrically connected to the scan line $G_1$.

The liquid crystal capacitor CLC is formed between the second end of the first switch 201 and the second end of the second switch 202. The first capacitor C1 has a first end and a second end, and the first end of the first capacitor C1 is electrically connected to the second end of the first switch 201. The second capacitor C2 has a first end and a second end, and the first end of the second capacitor C2 is electrically connected to the second end of the second switch 202.

The first storage capacitor Cst1 has a first end and a second end, the first end of the first storage capacitor Cst1 is electrically connected to the second end of the third switch 203, and the second end of the first storage capacitor Cst1 receives a reference voltage. The second storage capacitor Cst2 has a first end electrically connected to the second end of the fourth switch 204, and a second end receiving the reference voltage.

At least one switching unit 210 is electrically connected to the scan line $G_2$, the first end of the first storage capacitor Cst1, the first end of the second storage capacitor Cst2, the second end of the first capacitor C1, and the second end of the second capacitor C2, and is used for redistributing charges between the first storage capacitor Cst1 and the second capacitor C2 and charges between the second storage capacitor Cst2 and the first capacitor C1.

In some embodiments, the at least one switching unit 210 is practically single, which includes a seventh switch 207. The seventh switch 207 is a transistor and has a first end electrically connected to the first end of the second storage capacitor Cst2 and the second end of the first capacitor C1, a control end electrically connected to the scan line $G_2$, and a second end electrically connected to the first end of the first storage capacitor Cst1 and the second end of the second capacitor C2.

In another embodiment, the pixel driving circuit 500 further includes a third capacitor C3 and a fourth capacitor C4, which have a first end and a second end respectively. The first end of the third capacitor C3 is electrically connected to the first end of the first capacitor C1, the second end of the third capacitor C3 is used for receiving the reference voltage. The first end of the fourth capacitor C4 is electrically connected to the first end of the second capacitor C2, and the second end of the fourth capacitor C4 is used for receiving the reference voltage. The connection relationship of the remaining elements in the pixel driving circuit 500 can refer to the foregoing description, which is described again here.

Figure 6:
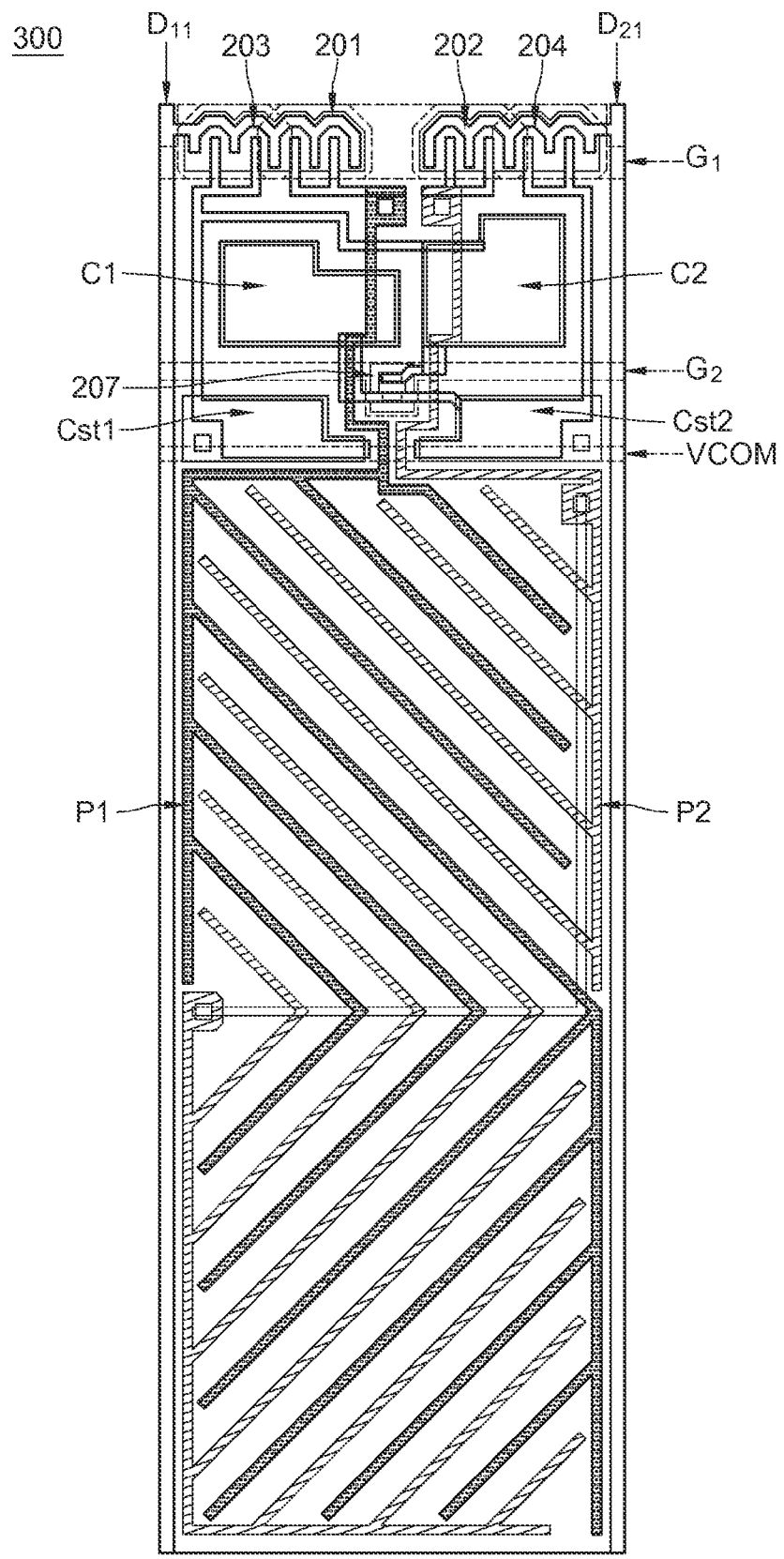
FIG. 6 is a schematic view of a pixel array circuit layout of a pixel driving circuit in the disclosure.

FIG. 6 is a schematic view of a pixel array circuit layout 600 according to another embodiment of the disclosure. To correspond to the embodiments above, the same label is adopted for the same elements. The pixel array circuit layout 600 includes a first switch 201, a second switch 202, a third switch 203, a fourth switch 204, a seventh switch 207, a first capacitor C1, a second capacitor C2, a first storage capacitor Cst1, a second storage capacitor Cst2, a scan line $G_1$, a scan line $G_2$, a first data line $D_{11}$ and a second data line $D_{21}$. The scan line $G_1$ and the scan line $G_2$ intersect with the first data line $D_{11}$ and the second data line $D_{21}$, and each switch is connected to the scan line and the data line.

The first switch 201 is electrically connected to the scan line $G_1$ and the first data line $D_{11}$. The second switch 202 is electrically connected to the scan line $G_1$ and the second data line $D_{21}$. The third switch 203 is electrically connected to the scan line $G_1$ and the first data line $D_{11}$. The fourth switch 204 is electrically connected to the scan line $G_1$ and the second data line $D_{21}$. The seventh switch 207 is electrically connected to the scan line $G_2$. The third switch 203 is electrically connected to the scan line $G_1$, and the first storage capacitor Cst1 is adjacent to the second storage capacitor Cst2. In addition, the fourth switch 204 is electrically connected to the scan line $G_1$ and the sixth switch 206, and the second storage capacitor Cst2 is located below the second capacitor C2. The node P1 is a finger electrode, and is electrically connected to the first switch 201 and the first capacitor C1, and the node P2 is a finger electrode, and is electrically connected to the second switch 202 and the second capacitor C2. The driving method and operation of the pixel driving circuit 500 in the disclosure are described as follows.

Figure 7:
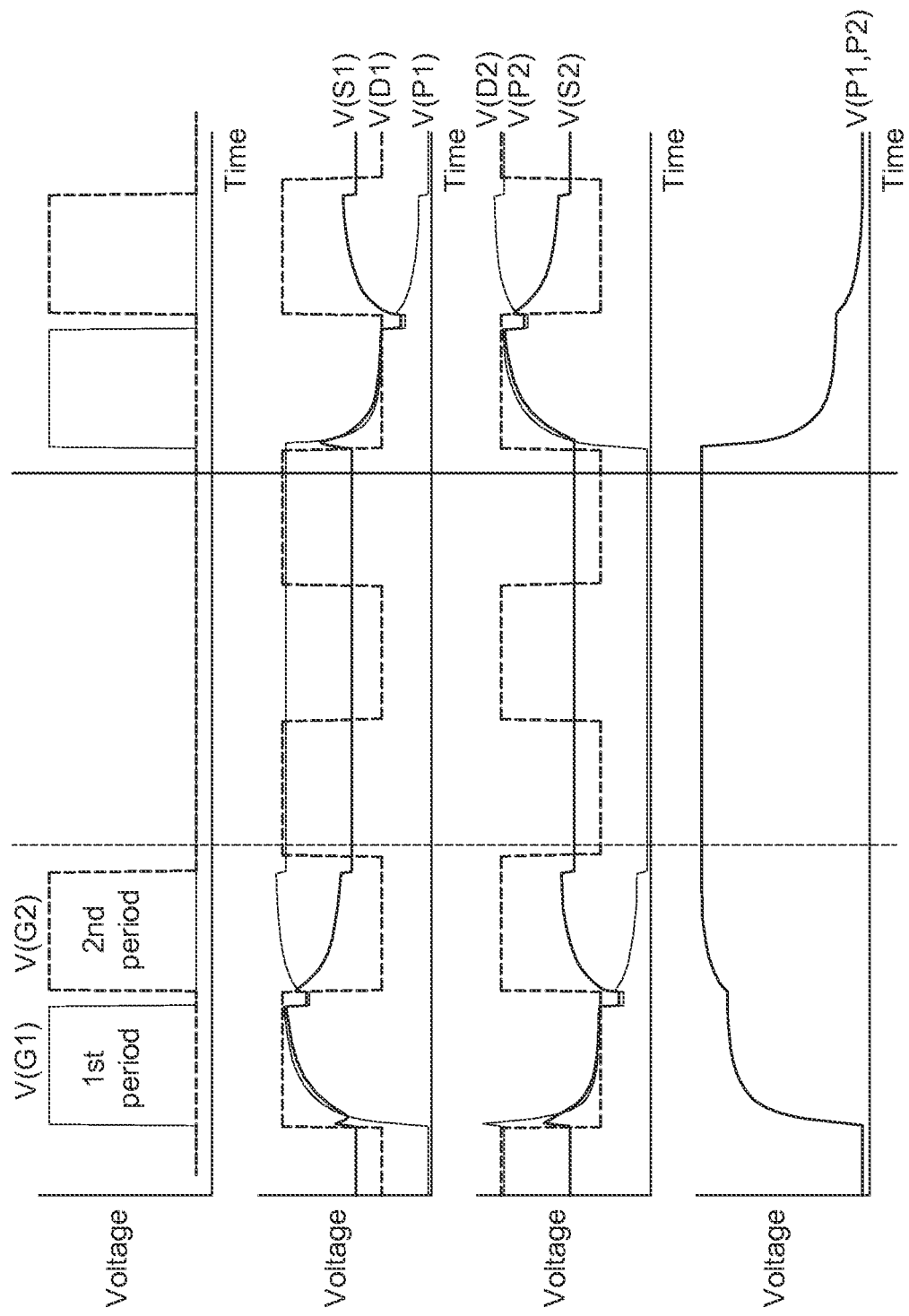
FIG. 7 is a simulation waveform diagram of a pixel driving circuit in the disclosure.

Referring to FIG. 7, in a first period, when the first switch 201, the second switch 202, the third switch 203 and the fourth switch 204 are turned on, and when the scan line $G_1$ is enabled, a first data voltage is supplied to the first capacitor C1 and the first storage capacitor Cst1 through the first data line $D_{11}$, and a second data voltage having a polarity different from a polarity of the first data voltage is supplied to the second capacitor C2 and the second storage capacitor Cst2 through the second data line $D_{21}$. Herein, the node P1 and the node S1 are charged via the first data line $D_{11}$ to have positive voltages, whereas the node P2 and the node S2 are charged via the second data line $D_{21}$ to have negative voltages.

Subsequently, in a second period which does not overlap the first period, when at least one switching unit 210 is turned on and the scan line $G_2$ is enabled, the first data voltage, maintained by the first storage capacitor Cst1, and the second data voltage, maintained by the second capacitor C2 and the second storage capacitor Cst2, are redistributed, and the second data voltage, maintained by the second storage capacitor Cst2, and the first data voltage, maintained by the first capacitor C1 and the first storage capacitor Cst1, are redistributed.

When the scan line $G_1$ is disabled and the scan line $G_2$ is enabled, the node S1 and the node S2 are conducted. Herein, the voltage of the node S1 is dropped, so that the floating voltage of the node P2 is also dropped. Meanwhile, the voltage of the node S2 is increased, so that the floating voltage of the node P1 is also increased. Therefore, the voltage difference V(P1,P2) between the two electrodes of the liquid crystal capacitor CLC is substantially increased and becomes higher than a driving voltage range. When the capacitance values of the first capacitor C1 and the second capacitor C2 are larger, the voltage difference between the nodes P1 and P2 is larger.

In the first period, when the scan line $G_1$ is enabled, the first switch 201, the second switch 202, the third switch 203 and the fourth switch 204 are turned on. Herein, the first data voltage V(D1) is supplied, and the second data voltage V(D2) having the polarity different from the polarity of the first data voltage V(D1) is also supplied. Thus, the voltage V(P1) of the node P1 and the voltage V(S1) of the node S1 are increased with the first data voltage V(D1), and the voltage V(P2) of the node P2 and the voltage V(S2) of the node S2 are reduced with the second data voltage V(D2). Herein, the node P1 and the node S1 are charged via the first data line $D_{11}$ to have positive voltages, and the node P2 and the node S2 are charged via the second data line $D_{21}$ to have negative voltages.

Subsequently, in the second period, when the scan line $G_1$ is disabled and the scan line $G_2$ is enabled, the first switch 201, the second switch 202, the third switch 203 and the fourth switch 204 are turned off, and the seventh switch 207 is turned on. Herein, charges are neutralized and redistributed, and the node S1 and the node S2 are conducted. The voltage V(S1) of the node S1 is dropped, so that the voltage V(P2) of the node P2 is also dropped. Meanwhile, the voltage (S2) of the node S2 V is increased, so that the voltage V(P1) of the node P1 is also increased. Accordingly, when this process is repeated, the voltage difference V(P1,P2) between the two electrodes of the liquid crystal capacitor CLC is substantially increased and becomes higher than a driving voltage range. When the at least one switching unit 210 has only one switch practically, the pixel may have a lower aperture ratio.

For the pixel driving circuit according to the disclosure, at least one switching unit is electrically connected to the scan line, the first and second storage capacitors, the first and second capacitors respectively coupled between the corresponding switch and the corresponding electrode of the liquid crystal capacitor, so that charges stored in the first and second storage capacitors and the first and second capacitors are redistributed. Thus, through the charge sharing manner and a driving method of two data lines, the two electrodes of the liquid crystal capacitor have a voltage difference therebetween, which is higher than the driving voltage range, so that liquid crystals are driven by a stronger electrical field and have a large tilt angle. Thus, the disclosure may have a better transmittance and correct the color washout at the side view.

What is claimed is:

1. A pixel driving circuit, coupled between a first data line and a second data line, and coupled between a first scan line and a second scan line, the pixel driving circuit comprising:
    a first switch, having a first end, a second end and a control end, the first end of the first switch being directly connected to the first data line, and the control end of the first switch being directly connected to the first scan line;
    a second switch, having a first end, a second end and a control end, the first end of the second switch being directly connected to the second data line, and the control end of the second switch being directly connected to the first scan line;
    a third switch, having a first end, a second end and a control end, the first end of the third switch being directly connected to the first data line, and the control end of the third switch being directly connected to the first scan line;
    a fourth switch, having a first end, a second end and a control end, the first end of the fourth switch directly connected to the second data line, and the control end of the fourth switch being directly connected to the first scan line;
    a liquid crystal capacitor, being formed between the second end of the first switch and the second end of the second switch;
    a first capacitor, having a first end and a second end, and the first end of the first capacitor being directly connected to the second end of the first switch;
    a second capacitor, having a first end and a second end, and the first end of the second capacitor being directly connected to the second end of the second switch;
    a first storage capacitor, having a first end and a second end, the first end of the first storage capacitor being directly connected to the second end of the third switch, and the second end of the first storage capacitor being used for receiving a reference voltage;
    a second storage capacitor, having a first end and a second end, the first end of the second storage capacitor being directly connected to the second end of the fourth switch, and the second end of the second storage capacitor being used for receiving the reference voltage; and
    a plurality of switching units, each of the plurality of switching units having a first end, a second end and a control end, the first end of each of the plurality of switching units being directly connected to the first end of the first storage capacitor and the second end of the second capacitor, the control end of each of the plurality of switching units being directly connected to the second scan line, and the second end of each of the plurality of switching units being directly connected to the first end of the second storage capacitor and the second end of the first capacitor.

2. The pixel driving circuit according to claim 1, further comprising:
    a third capacitor, having a first end and a second end, the first end of the third capacitor being directly connected to the second end of the first switch, and the second end of the third capacitor being used for receiving the reference voltage; and
    a fourth capacitor, having a first end and a second end, the first end of the fourth capacitor being directly connected to the second end of the second switch, and the second end of the fourth capacitor being used for receiving the reference voltage.

3. A driving method, adapted to the pixel driving circuit of claim 1, the driving method comprising:
    enabling the first scan line, and supplying a first data voltage and a second data voltage, which has a polarity different from a polarity of the first data voltage, to the pixel driving circuit; and
    enabling the second scan line, and turning on the at least one switching unit to distribute charges in the pixel driving circuit.

4. The driving method according to claim 3, wherein in the step of enabling the first scan line, and supplying the first data voltage and the second data voltage, which has the polarity different from the polarity of the first data voltage, to the pixel driving circuit, the driving method further comprises:
    maintaining the first data voltage by the first capacitor and the first storage capacitor; and
    maintaining the second data voltage by the second capacitor and the second storage capacitor.

5. The driving method according to claim 3, wherein in the step of enabling the second scan line, and turning on the at least one switching unit to distribute charges in the pixel driving circuit, the driving method further comprises:
    neutralizing charges among the first capacitor, the second capacitor, the first storage capacitor and the second storage capacitor.

6. The driving method according to claim 5, wherein the step of neutralizing the charges among the first capacitor, the second capacitor, the first storage capacitor and the second storage capacitor comprises:
    increasing a charge difference between the first capacitor and the second capacitor.

7. A pixel matrix, comprising:
    a plurality of first scan lines and a plurality of second scan lines;
    a plurality of first data lines and a plurality of second data lines;
    a plurality of subpixels, each subpixel being directly connected to the corresponding first scan line and the corresponding second scan line, and each subpixel being directly connected to the corresponding first data line and the corresponding second data line, wherein each subpixel comprises:
    a first switch, having a first end, a second end and a control end, the first end of the first switch being directly connected to the corresponding first data line, and the control end of the first switch being directly connected to the corresponding first scan line;
    a second switch, having a first end, a second end and a control end, the first end of the second switch being directly connected to the corresponding second data line, and the control end of the second switch being directly connected to the corresponding first scan line;
    a third switch, having a first end, a second end and a control end, the first end of the third switch being directly connected to the corresponding first data line, and the control end of the third switch being directly connected to the corresponding first scan line;

a fourth switch, having a first end, a second end and a control end, the first end of the fourth switch being directly connected to the corresponding second data line, and the control end of the fourth switch being directly connected to the corresponding first scan line;

a liquid crystal capacitor, formed between the second end of the first switch and the second end of the second switch;

a first capacitor, having a first end and a second end, and the first end of the first capacitor being directly connected to the second end of the first switch;

a second capacitor, having a first end and a second end, and the first end of the second capacitor being directly connected to the second end of the second switch;

a first storage capacitor, having a first end and a second end, the first end of the first storage capacitor being directly connected to the second end of the third switch, and the second end of the first storage capacitor being used for receiving a reference voltage;

a second storage capacitor, having a first end and a second end, the first end being directly connected to the second end of the fourth switch, and the second end of the second storage capacitor being used for receiving the reference voltage; and a plurality of switching units, each of the plurality of switching units having a first end, a second end and a control end, the first end of each of the plurality of switching units being directly connected to the first end of the first storage capacitor and the second end of the second capacitor, the control end of each of the plurality of switching units being directly connected to the second scan line, and the second end of each of the plurality of switching units being directly connected to the first end of the second storage capacitor and the second end of the first capacitor.

8. The pixel matrix according to claim 7, wherein each pixel driving circuit further comprises:

a third capacitor and a fourth capacitor, the third capacitor having a first end and a second end, the fourth capacitor having a first end and a second end, the first end of the third capacitor being directly connected to the second end of the first switch, the second end of the third capacitor being used for receiving the reference voltage, the first end of the fourth capacitor being directly connected to the second end of the second switch, and the second end of the fourth capacitor being used for receiving the reference voltage.

* * * * *